(12) United States Patent
Wakimoto (10) Patent No.: US 12,142,796 B2
(45) Date of Patent: Nov. 12, 2024

(54) SECONDARY BATTERY (71) Applicant: SANYO Electric Co., Ltd., Osaka (JP)

(72) Inventor: Ryoichi Wakimoto, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 390 days.

(21) Appl. No.: 17/633,362

(22) PCT Filed: Sep. 11, 2020

(86) PCT No.: PCT/JP2020/034403
§ 371 (c)(1),
(2) Date: Feb. 7, 2022

(87) PCT Pub. No.: WO2021/060008
PCT Pub. Date: Apr. 1, 2021

(65) Prior Publication Data
US 2022/0302558 A1 Sep. 22, 2022

(30) Foreign Application Priority Data
Sep. 26, 2019 (JP) .................. 2019-175808

(51) Int. Cl.
H01M 50/54 (2021.01)
H01M 50/103 (2021.01)
(Continued)

(52) U.S. Cl.
CPC ......... *H01M 50/54* (2021.01); *H01M 50/103* (2021.01); *H01M 50/528* (2021.01); *H01M 50/543* (2021.01); *H01M 50/583* (2021.01)

(58) Field of Classification Search
CPC .... H01M 50/50; H01M 50/54; H01M 50/583; H01M 50/104
See application file for complete search history.

(56) References Cited

U.S. PATENT DOCUMENTS

2007/0196732 A1* 8/2007 Tatebayashi ............ B60L 50/20
429/162
2013/0266830 A1 10/2013 Byun et al.
(Continued)

FOREIGN PATENT DOCUMENTS

CN 101026250 A 8/2007
CN 109119668 A 1/2019
(Continued)

OTHER PUBLICATIONS

International Search Report issued in International Patent Application No. PCT/JP2020/034403, dated Dec. 1, 2020, with English translation.
(Continued)

*Primary Examiner* — Kenneth J Douyette
(74) *Attorney, Agent, or Firm* — Rimon P.C.

(57) ABSTRACT

A secondary battery includes an electrode body configured such that a positive electrode plate and a negative electrode plate are tacked on each other with a separator being interposed therebetween, an exterior body having an opening and housing the electrode body, a sealing plate sealing the opening, and an external terminal attached to the sealing plate. Tabs provided at the positive electrode plate and the negative electrode plate are electrically connected to the external terminal via a current collector arranged between the electrode body and the sealing plate. The current collector has a first connection portion connected to the tabs and a second connection portion with a fuse portion. The fuse portion is fused when overcurrent flows in the current path. A portion of the fuse portion facing the electrode body is covered with a fuse portion insulating member made of a material whose melting point is 200° C. or higher.

6 Claims, 4 Drawing Sheets (51) Int. Cl.
*H01M 50/528* (2021.01)
*H01M 50/543* (2021.01)
*H01M 50/583* (2021.01)

(56) References Cited

U.S. PATENT DOCUMENTS

2016/0049635 A1   2/2016   Park et al.
2017/0250394 A1   8/2017   Wakimoto et al.
2018/0375070 A1   12/2018  Wakimoto et al.

FOREIGN PATENT DOCUMENTS

| EP | 2933856 A1 | 10/2015 |
| JP | 2013-219003 A | 10/2013 |
| JP | 2017-157334 A | 9/2017 |
| JP | 2019-008972 A | 1/2019 |
| JP | 2019-087341 A | 6/2019 |

OTHER PUBLICATIONS

Indian Office Action dated Jul. 28, 2022 issued in the corresponding Indian Patent Application No. 202247007386, with English translation.
Extended European Search Report received in PCT/JP2020034403, dated Sep. 6, 2023.
Hearing Notice dated Jan. 31, 2024 issued in the corresponding Indian Patent Application No. 202247007386, with English translation.

* cited by examiner

SECONDARY BATTERY

CROSS-REFERENCE OF RELATED APPLICATIONS

This application is the U.S. National Phase under 35 U.S.C. § 371 of International Patent Application No. PCT/JP2020/034403, filed on Sep. 11, 2020, which in turn claims the benefit of Japanese Application No. 2019-175808, filed on Sep. 26, 2019, the entire disclosures of which Applications are incorporated by reference herein.

TECHNICAL FIELD

The present disclosure relates to a secondary battery.

BACKGROUND ART

Rectangular secondary batteries such as alkaline secondary batteries and nonaqueous electrolyte secondary batteries have been used as power sources for driving electric vehicles (EV) and hybrid electric vehicles (HEV, PHEV).

In such a rectangular secondary battery, a bottomed tubular rectangular exterior body having an opening and a sealing plate sealing the opening form a battery case. The battery case houses, together with an electrolyte, an electrode body including a positive electrode plate, a negative electrode plate, and a separator. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

Moreover, for such a secondary battery, it has been proposed that a fuse is provided at the current collector electrically connecting the terminal and the electrode body to each other for the purpose of preventing damage of the battery due to overcurrent in the battery.

CITATION LIST

Patent Document

PATENT DOCUMENT 1: Japanese Unexamined Patent Publication No. 2013-219003

SUMMARY OF THE INVENTION

In the configuration of Patent Document 1, a guide member guides gas generated in a fuse region to move to a first short-circuit member. However, in this structure, there is a probability that when the fuse region is fused due to overcurrent, the guide member is damaged due to spark or heat generated, the electrode body is damaged accordingly, and as a result, internal short-circuit is caused.

The secondary battery of the present disclosure includes an electrode body configured such that a positive electrode plate and a negative electrode plate are stacked on each other with a separator being interposed therebetween, an exterior body having an opening and housing the electrode body, a sealing plate sealing the opening, and an external terminal attached to the sealing plate. A tab provided at least at one of the positive electrode plate or the negative electrode plate is electrically connected to the external terminal via a current collector arranged between the electrode body and the sealing plate. The current collector has a first connection portion connected to the tab or a tab conductive member connected to the tab and a second connection portion with a fuse portion. The fuse portion is a portion formed with the minimum sectional area perpendicular to a current direction in a current path from the tab to the external terminal such that the fuse portion is fused when overcurrent flows in the current path. A portion of the fuse portion facing the electrode body is covered with a fuse portion insulating member. The fuse portion insulating member is a member made of a material whose melting point is 200° C. or higher.

The fuse portion insulating member may contact the fuse portion to support the fuse portion.

The fuse portion insulating member may also cover a portion of the second connection portion adjacent to the fuse portion.

A sealing-plate-to-current-collector insulating member may be arranged between the sealing plate and the current collector, and the fuse portion insulating member may be supported by the sealing-plate-to-current-collector insulating member.

On the side of the external terminal facing the electrode body, an external terminal protective insulating member may be arranged between the external terminal and the electrode body. The sealing-plate-to-current-collector insulating member may be arranged between the sealing plate and the current collector. The external terminal protective insulating member may be supported by the sealing-plate-to-current-collector insulating member.

The exterior body may be in a rectangular shape. The first connection portion may be positioned inside the second connection portion in a longitudinal direction of the sealing plate. The second connection portion may have a terminal-side connection portion to be connected to the external terminal or an external terminal conductive member connected to the external terminal. The fuse portion may be positioned outside the terminal-side connection portion in the longitudinal direction of the sealing plate.

According to the present disclosure, a highly-reliable secondary battery can be provided.

DESCRIPTION OF EMBODIMENTS

Hereinafter, embodiments of the present disclosure will be described in detail with reference to the drawings. Description of the preferred embodiments below is merely an example in nature, and is not intended to limit the scope, application, or use of the present disclosure. For the sake of simplicity in description, the same reference numerals are used to represent components having the substantially same functions in the drawings described below.

First Embodiment

The configuration of a rectangular secondary battery 20 as a secondary battery according to a first embodiment will be described below.

Figure 1:
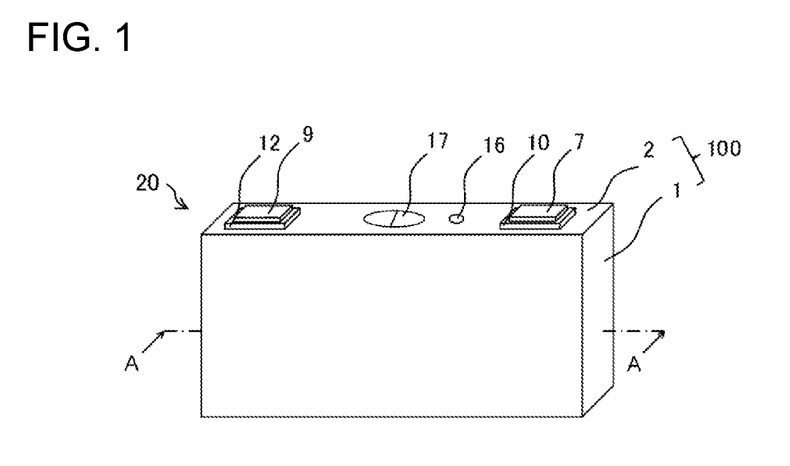
FIG. 1 is a schematic perspective view of a secondary battery according to a certain embodiment.
Figure 2:
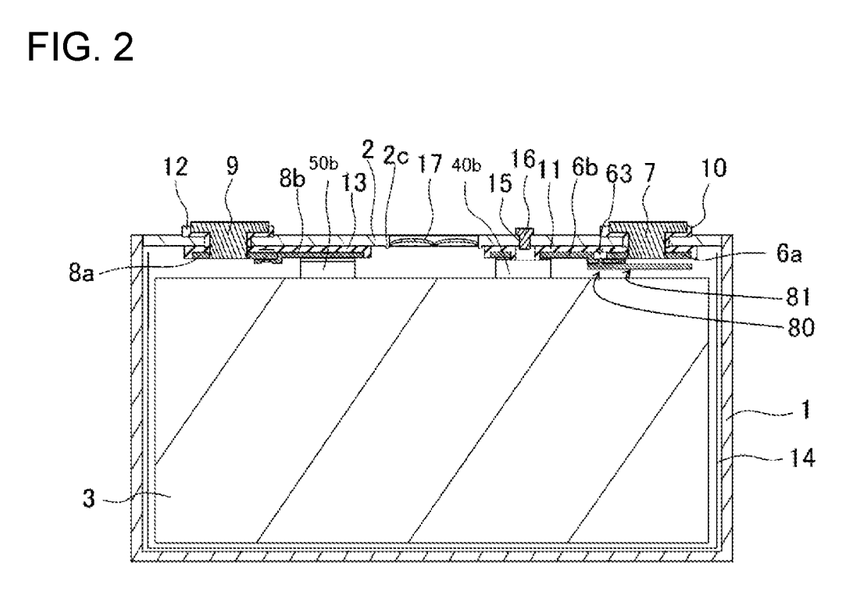
FIG. 2 is a schematic sectional view along a line A-A of FIG. 1.

As shown in FIGS. 1 and 2, the rectangular secondary battery 20 includes a battery case 100 having a rectangular exterior body 1 in a bottomed rectangular tubular shape with an opening and a sealing plate 2 sealing the opening of the rectangular exterior body 1. Each of the rectangular exterior body 1 and the sealing plate 2 is preferably made of metal, and is preferably made of aluminum or aluminum alloy, for example. The rectangular exterior body 1 houses an electrode body 3 together with an electrolyte, a positive electrode plate and a negative electrode plate being stacked on each other with a separator being interposed therebetween. As will be described later, in the present embodiment, the electrode body 3 includes first and second electrode body elements, these two electrode body elements having the same configuration.

The sealing plate 2 is provided with an electrolyte injection hole 15, and the electrolyte injection hole 15 is sealed by a sealing member 16. The sealing plate 2 is provided with a gas discharge valve 17 configured to be broken when the internal pressure of the battery case 100 reaches a predetermined value or greater to discharge gas from the battery case 100 to the outside of the battery case 100. An annular protrusion 2c is provided around the gas discharge valve 17 on a battery-inner-side surface of the sealing plate 2.

A positive electrode tab group 40b and a negative electrode tab group 50b are provided at a sealing-plate-2-side end portion of the electrode body 3. The positive electrode tab group 40b is electrically connected to a positive electrode terminal (an external terminal) 7 via a positive electrode current collector 6b and a positive electrode terminal conductive member (an external terminal conductive member) 6a. The negative electrode tab group 50b is electrically connected to a negative electrode terminal (an external terminal) 9 via a negative electrode current collector 8b and a negative electrode terminal conductive member (an external terminal conductive member) 8a.

The positive electrode current collector 6b, the positive electrode terminal conductive member 6a, and the positive electrode terminal 7 are preferably made of metal, more preferably aluminum or aluminum alloy. A resin external insulating member 10 is arranged between the positive electrode terminal 7 and the sealing plate 2. A resin internal insulating member (a sealing-plate-to-current-collector insulating member) 11 is arranged between the sealing plate 2 and each of the positive electrode current collector 6b and the positive electrode terminal conductive member 6a.

The negative electrode current collector 8b, the negative electrode terminal conductive member 8a, and the negative electrode terminal 9 is preferably made of metal, more preferably copper or copper alloy. A resin external insulating member 12 is arranged between the negative electrode terminal 9 and the sealing plate 2. A resin internal insulating member 13 is arranged between the sealing plate 2 and each of the negative electrode current collector 8b and the negative electrode terminal conductive member 8a.

An electrode body holder 14 formed of a resin sheet is arranged between the electrode body 3 and the rectangular exterior body 1. The electrode body holder 14 is preferably formed in such a manner that a resin insulating sheet is bent in a bag shape or a box shape.

Next, the method for manufacturing the rectangular secondary battery 20 and each configuration of the rectangular secondary battery 20 will be described in detail.
[Positive Electrode Plate]

Figure 3:
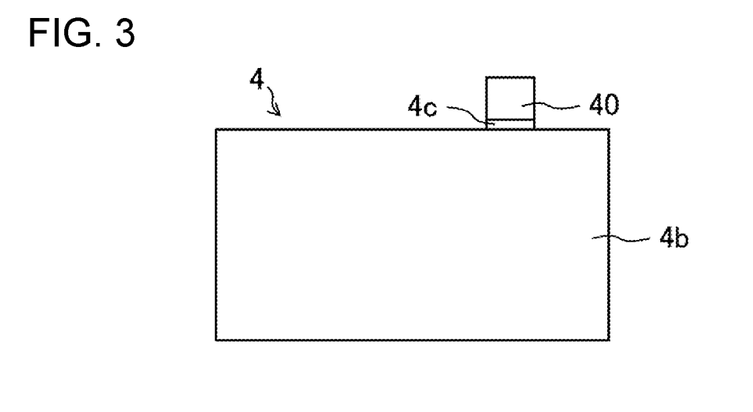
FIG. 3 is a schematic plan view of a positive electrode plate.

FIG. 3 is a plan view of a positive electrode plate 4. The positive electrode plate 4 has a body portion configured such that positive electrode active material mixture layers 4b containing a positive electrode active material are formed on both sides of a rectangular positive electrode core. The positive electrode core protrudes from an end of the body portion, and such a protruding portion of the positive electrode core forms a positive electrode tab 40. Note that the positive electrode tab 40 may be part of the positive electrode core or another member may be connected to the positive electrode core to form the positive electrode tab 40. At a portion of the positive electrode tab 40 adjacent to the positive electrode active material mixture layers 4b, a positive electrode protective layer 4c having a higher electric resistance than that of the positive electrode active material mixture layer 4b is preferably provided. Note that metal foil such as aluminum foil or aluminum alloy foil is preferably used for the positive electrode core. For example, lithium-transition metal composite oxide is preferably used as the positive electrode active material.
[Negative Electrode Plate]

Figure 4:
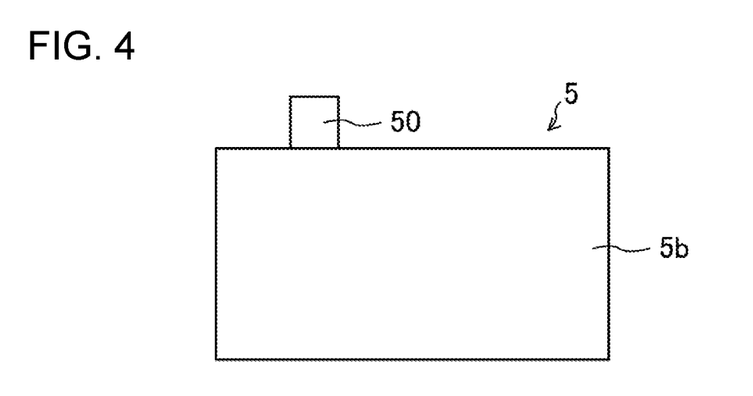
FIG. 4 is a schematic plan view of a negative electrode plate.

FIG. 4 is a plan view of a negative electrode plate 5. The negative electrode plate 5 has a body portion configured such that negative electrode active material mixture layers 5b containing a negative electrode active material are formed on both sides of a rectangular negative electrode core. The negative electrode core protrudes from an end of the body portion, and such a protruding portion of the negative electrode core forms a negative electrode tab 50. Note that the negative electrode tab 50 may be part of the negative electrode core or another member may be connected to the negative electrode core to form the negative electrode tab 50. Note that metal foil such as copper foil or copper alloy foil is preferably used for the negative electrode core. For example, a carbon material or a material containing silicon is preferably used as the negative electrode active material.
[Production of Electrode Body]

Figure 5:
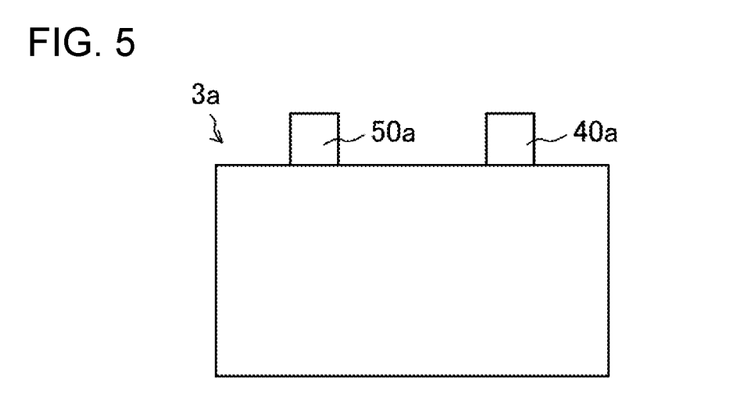
FIG. 5 is a schematic plan view of an electrode body element.

After 50 positive electrode plates 4 and 51 negative electrode plates 5 have been produced, these plates are stacked on each other with a polyethylene quadrangular separator being interposed between adjacent ones of the plates, and a multilayer first electrode body element 3a is produced as shown in FIG. 5. Note that a second electrode body element also has the same configuration/structure. The multilayer first electrode body element 3a has, at one end portion thereof, a first positive electrode tab group 40a configured such that the positive electrode tabs 40 of the positive electrode plates 4 are stacked on each other and a first negative electrode tab group 50a configured such that the negative electrode tabs 50 of the negative electrode plates 5 are stacked on each other. Separators are arranged on both outer surfaces of the first electrode body element 3a, and the electrode plates and the separators can be fixed in a multilayer state in such a manner that, e.g., an adhesive tap is wound around an outer peripheral surface of the first electrode body element 3a. Alternatively, adhesive layers may be provided on separator surfaces, and in this manner, the separator and the positive electrode plate 4 may be bonded to each other and the separator and the negative electrode plate 5 may be bonded to each other.

Note that the size of the separator as viewed in plane is preferably equal to or greater than that of the negative electrode plate 5. After the positive electrode plate 4 or the negative electrode plate 5 has been arranged between two separators and the peripheral edges of the separators have been thermally welded to each other, the positive electrode plates 4 and the negative electrode plates 5 may be stacked on each other. Alternatively, a long separator may be folded in a zigzag pattern, and the positive electrode plates 4 and the negative electrode plates 5 may be alternately interposed between adjacent ones of the folds to form an electrode body. Note that a band-shaped positive electrode plate and a band-shaped negative electrode plate may be wound with a band-shaped separator being interposed therebetween to form a winding electrode body.

[Connection Among Current Collectors and Tabs]

Figure 6:
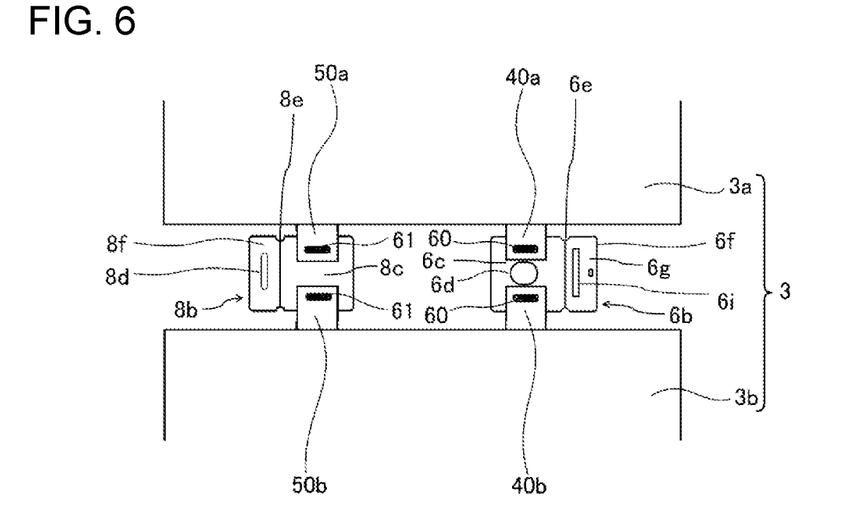
FIG. 6 is a schematic view showing a state in which a positive electrode tab group is connected to a positive electrode current collector and a negative electrode tab group is connected to a negative electrode current collector in the certain embodiment.

FIG. 6 is a view showing a state in which the first positive electrode tab group 40a of the first electrode body element 3a and the second positive electrode tab group 40b of a second electrode body element 3b are connected to the positive electrode current collector 6b and the first negative electrode tab group 50a of the first electrode body element 3a and the second negative electrode tab group 50b of the second electrode body element 3b are connected to the negative electrode current collector 8b. The positive electrode current collector 6b has such a structure that a first connection portion 6c and a second connection portion 6f are connected to each other via a coupling portion 6e. The negative electrode current collector 8b has such a structure that a first connection portion 8c and a second connection portion 8f are connected to each other via a coupling portion 8e.

As shown in FIG. 6, the first electrode body element 3a and the second electrode body element 3b are arranged such that tip ends of the first positive electrode tab group 40a and the second positive electrode tab group 40b face each other and tip ends of the first negative electrode tab group 50a and the second negative electrode tab group 50b face each other. Then, the first positive electrode tab group 40a and the second positive electrode tab group 40b are arranged on the first connection portion 6c of the positive electrode current collector 6b. Moreover, the first negative electrode tab group 50a and the second negative electrode tab group 50b are arranged on the first connection portion 8c of the negative electrode current collector 8b. Each of the first positive electrode tab group 40a and the second positive electrode tab group 40b is, by welding, connected to the first connection portion 6c, and accordingly, welded portions 60 are formed. Similarly, each of the first negative electrode tab group 50a and the second negative electrode tab group 50b is, by welding, connected to the first connection portion 8c, and accordingly, welded portions 61 are formed. A welding method is preferably ultrasonic welding or resistance welding. Note that connection can be made by laser welding.

[Configuration of Sealing Plate]

Figure 7:
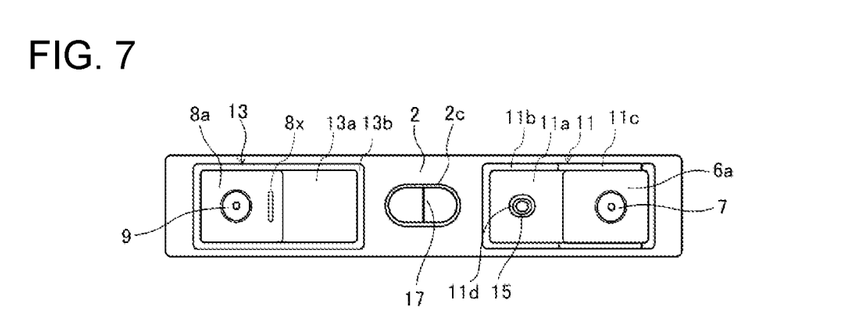
FIG. 7 is a schematic view of a sealing plate from an electrode body side, each component according to the certain embodiment being assembled with the sealing plate.

FIG. 7 is a view of the sealing plate 2 from an electrode body 3 side after attachment of the positive electrode terminal 7, the positive-electrode-side external insulating member (not shown), the positive-electrode-side internal insulating member 11, the positive electrode terminal conductive member 6a, the negative electrode terminal 9, the negative-electrode-side external insulating member (not shown), the negative-electrode-side internal insulating member 13, and the negative electrode terminal conductive member 8a.

The sealing plate 2, the positive-electrode-side external insulating member, the positive-electrode-side internal insulating member 11, the positive electrode terminal conductive member 6a, the negative-electrode-side external insulating member, the negative-electrode-side internal insulating member 13, and the negative electrode terminal conductive member 8a have through-holes into which the positive electrode terminal 7 or the negative electrode terminal 9 is insertable.

The positive-electrode-side internal insulating member 11 has a positive-electrode-side base 11a arranged in parallel with the sealing plate 2. A positive-electrode-side rib 11b protruding from the base 11a to the electrode body 3 side is provided at an outer peripheral edge of the base 11a. Walls 11c further extending from the rib 11b to the electrode body 3 side are provided on the rib 11b in the vicinity of two sides along a longitudinal direction of the sealing plate 2 of the positive electrode terminal conductive member 6a. That is, the wall 11c has a greater height of protrusion from the base 11a than that of the rib 11b. Two types of through-holes described later are provided at the wall 11c. An opening 11d is provided at the base 11a not to close the electrolyte injection hole 15. Note that in the case of a structure in which the electrolyte injection hole 15 is not closed by the base 11a, the opening 11d is not necessarily provided.

The negative-electrode-side internal insulating member 13 has a negative-electrode-side base 13a arranged in parallel with the sealing plate 2. A negative-electrode-side rib 13b protruding from the base 13a to the electrode body 3 side is provided at an outer peripheral edge of the base 13a.

A protrusion 8x is provided on an electrode-body-3-side surface of the negative electrode terminal conductive member 8a. The shape of the protrusion 8x as viewed in plane is preferably a shape having a long side and a short side, such as a rectangular shape, an oval shape, or the shape of a running track.

[Assembly of Each Component with Sealing Plate]

The positive-electrode-side external insulating member 10 is arranged on the battery outer side around a positive electrode terminal insertion hole provided at the sealing plate 2. The positive-electrode-side internal insulating member 11 and the positive electrode terminal conductive member 6a are arranged on the battery inner side around the positive electrode terminal insertion hole of the sealing plate 2. From the battery outer side, the positive electrode terminal 7 is inserted into the through-hole of the positive-electrode-side external insulating member 10, the positive electrode terminal insertion hole of the sealing plate 2, the through-hole of the positive-electrode-side internal insulating member 11, and the through-hole of the positive electrode terminal conductive member 6a. Then, a tip end of the positive electrode terminal 7 is crimped onto the positive electrode terminal conductive member 6a. Accordingly, the positive electrode terminal 7 and the positive electrode terminal conductive member 6a are fixed to the sealing plate 2. Note that the crimped portion of the positive electrode terminal 7 and the positive electrode terminal conductive member 6a may be welded to each other.

Next, the negative-electrode-side external insulating member 12 is arranged on the battery outer side around a negative electrode terminal insertion hole of the sealing plate 2. The negative-electrode-side internal insulating member 13 and the negative electrode terminal conductive member 8a are arranged on the battery inner side around the negative electrode terminal insertion hole of the sealing plate 2. From the battery outer side, the negative electrode terminal 9 is inserted into the through-hole of the negative-electrode-side external insulating member 12, the negative electrode terminal insertion hole of the sealing plate 2, the through-hole of the negative-electrode-side internal insulating member 13, and the through-hole of the negative electrode terminal conductive member 8a. Then, a tip end of the negative electrode terminal 9 is crimped onto the negative electrode terminal conductive member 8a. Accordingly, the negative electrode terminal 9 and the negative electrode terminal conductive member 8a are fixed to the sealing plate 2. Note that the crimped portion of the negative electrode terminal 9 and the negative electrode terminal conductive member 8a may be welded to each other.

[Positive Electrode Current Collector]

Figure 8:
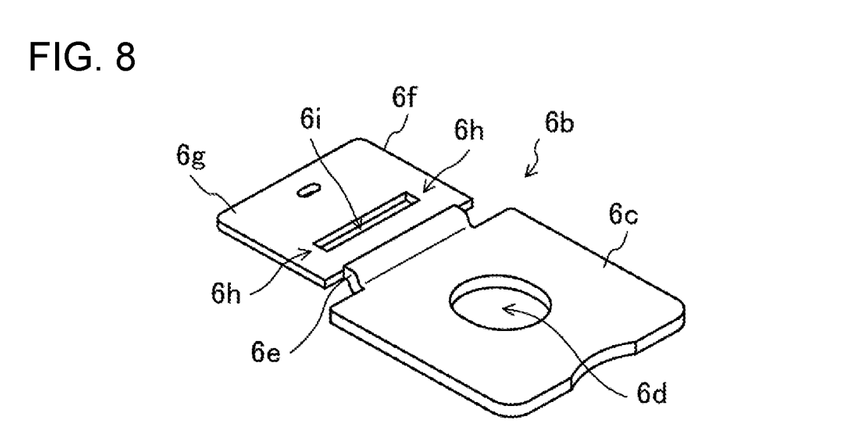
FIG. 8 is a schematic perspective view of the positive electrode current collector according to the certain embodiment.

FIG. 8 is a perspective view of the positive electrode current collector 6b. Note that a direction which is perpendicular to a direction (a longitudinal direction) in which the first connection portion 6c, the coupling portion 6e, and the second connection portion 6f are connected to each other and is a direction in which the first connection portion 6c and the second connection portion 6f expand is taken as a width direction of the positive electrode current collector 6b and a direction vertical to both the longitudinal direction and the width direction is taken as a thickness direction.

The first and second positive electrode tab group 40a, 40b are connected to the first connection portion 6c. Alternatively, a tab conductive member (not shown) connected to the first and second positive electrode tab groups 40a, 40b may be separately prepared and be connected to the first connection portion 6c such that the first and second positive electrode tab groups 40a, 40b and the first connection portion 6c are electrically connected to each other via the tab conductive member. An opening 6d is provided such that the electrolyte injection hole 15 is not closed by the first connection portion 6c. In the case of a structure in which the electrolyte injection hole 15 is not closed by the first connection portion 6c, the opening 6d is not necessarily provided.

The second connection portion 6f has a terminal-side connection portion 6g and fuse portions 6h provided between the terminal-side connection portion 6g and the coupling portion 6e.

In the present embodiment, the terminal-side connection portion 6g is electrically connected to the positive electrode terminal 7 via the positive electrode terminal conductive member 6a, but may be directly connected to the positive electrode terminal 7. For easy joint to the positive electrode terminal 7 or the positive electrode terminal conductive member 6a, the terminal-side connection portion 6g may have a smaller thickness than those of other portions of the positive electrode current collector 6b.

A slit-shaped through-hole 6i extending in the width direction is provided between the terminal-side connection portion 6g and the coupling portion 6e at the second connection portion 6f. Both sides of the through-hole 6i in the width direction form the fuse portions 6h. The fuse portion 6h is a portion having the minimum sectional area perpendicular to a current direction in current paths from the first and second positive electrode tab groups 40a, 40b to the positive electrode terminal 7. When overcurrent flows from the first and second positive electrode tab groups 40a, 40b to the positive electrode terminal 7, the fuse portions 6h are fused, and the current is cut off. That is, the sectional area of the fuse portion 6h is set to such a sectional area that the fuse portion 6h is fused due to Joule heat when a predetermined amount of current or greater (overcurrent) flows.

In the present embodiment, the through-hole 6i is a single hole having a rectangular opening shape, but the shape of the through-hole 6i and the number of through-holes 6i are not limited to above as long as the sectional area of the fuse portion 6h can be set to a predetermined sectional area. For example, the through-hole 6i may be an oval shape elongated in the width direction of the positive electrode current collector 6b, or a plurality of holes may be provided. For cutting off a current of a set current value or greater when such current flows, the portion provided with the through-hole 6i is designed to have the minimum sectional area in the current paths from the first and second positive electrode tab groups 40a, 40b to the positive electrode terminal 7 while the strength of the positive electrode current collector 6b is ensured.

The coupling portion 6e is a portion coupling the first connection portion 6c and the second connection portion 6f to each other. In the present embodiment, the coupling portion 6e is bent to form a step between the first connection portion 6c and the second connection portion 6f. However, the step is not necessarily provided. Upon formation of the coupling portion 6e, the width of the coupling portion 6e is formed narrower than those of the first connection portion 6c and the second connection portion 6f because the coupling portion 6e can be easily bent.

[Connection Between Terminal Conductive Member and Current Collector]

Figure 9:
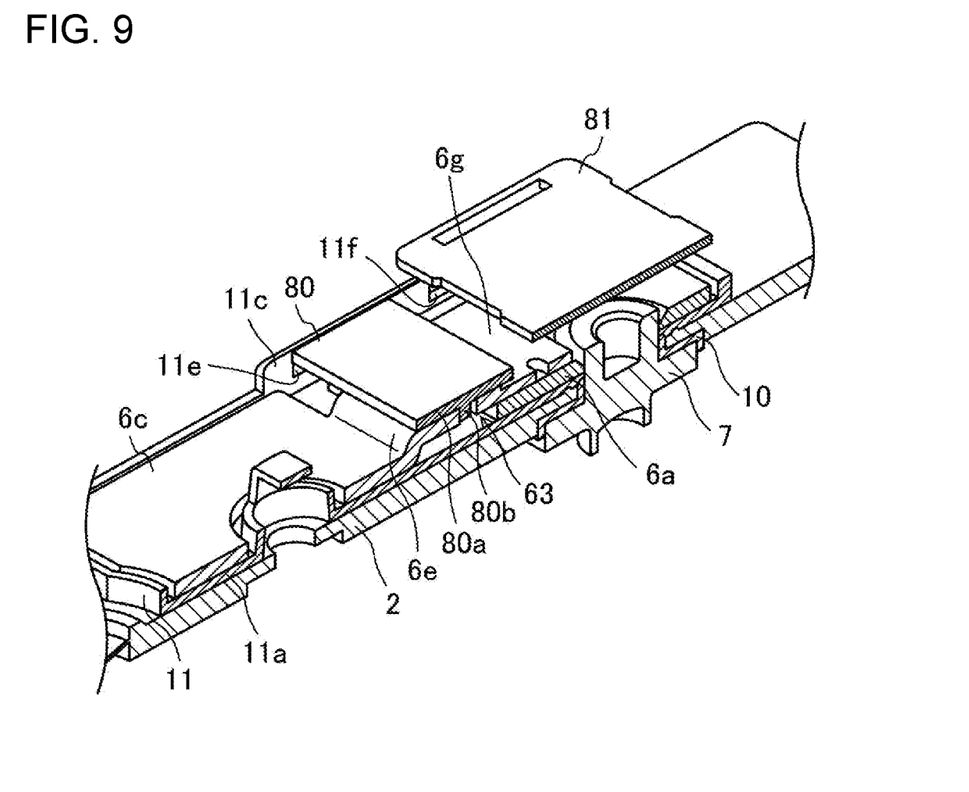
FIG. 9 is a schematic perspective sectional view of a positive electrode terminal portion of the sealing plate according to the certain embodiment from the electrode body side.

FIG. 9 is a schematic perspective sectional view of the sealing plate 2 from the electrode body side, the positive electrode current collector 6b, a fuse portion insulating member 80, and an external terminal protective insulating member 81 being attached to the sealing plate 2. Note that in FIG. 9, the first and second positive electrode tab groups 40a, 40b are not shown for the sake of visibility of the drawing.

The first connection portion 6c of the positive electrode current collector 6b to which the first and second positive electrode tab groups 40a, 40b are connected is arranged on the base 11a of the positive-electrode-side internal insulating member 11. After having been arranged on the positive electrode terminal conductive member 6a, the positive-electrode-side terminal-side connection portion 6g is joined to the positive electrode terminal conductive member 6a. As a joint method, both members can be joined to each other by irradiation with an energy line such as a laser.

As described above, in the present embodiment, the coupling portion 6e is bent to form the step between the first connection portion 6c and the second connection portion 6f. The positive electrode terminal conductive member 6a is present immediately below the terminal-side connection portion 6g, but does not extend to the position of the fuse portion 6h. Thus, by connection between the terminal-side connection portion 6g and the positive electrode terminal conductive member 6a, a space 63 can be provided between these portions without the fuse portions 6h contacting the internal insulating member 11, as shown in FIG. 9. Since the fuse portions 6h do not contact the internal insulating member 11, damage of the internal insulating member 11 due to spark or heat can be prevented when the function of the fuse portions 6h works. Accordingly, electrical re-connection between the sealing plate 2 and the positive electrode current collector 6b can be prevented.

As shown in FIGS. 6 and 7, the first connection portion 8c of the negative electrode current collector 8b to which the first and second negative electrode tab groups 50a, 50b are connected is arranged on the base 13a of the negative-electrode-side internal insulating member 13. A through-hole 8d having a thin portion is provided at the peripheral edge of the negative-electrode-side second connection portion 8f. The second connection portion 8f is arranged on the negative electrode terminal conductive member 8a with the through-hole 8d being fitted onto the protrusion 8x of the negative electrode terminal conductive member 8a. Then, such a fitted portion is joined. As a joint method, the fitted portion can be joined by irradiation with an energy line such as a laser.

[Fuse Portion Insulating Member]

As shown in FIG. 9, the fuse portion insulating member 80 has a rectangular flat plate-shaped base portion 80a, a raised portion 80b protruding from a center portion of the base portion 80a, and fixing claw portions (not shown) provided at both ends of the base portion 80a in the longitudinal direction. The fuse portion insulating member 80 is placed across the fuse portions 6h, and the fixing claw portions are fitted in and fixed to through-holes 11e provided at the walls 11c extending from the rib 11b of the internal insulating member 11.

The fuse portion insulating member 80 is a member made of a material whose melting point is 200° C. or higher. Since the melting point is high, dropping of spark or a fuse piece onto the electrode body can be reliably prevented even when the fuse function works. Thus, internal short-circuit due to dropping of spark or a fuse piece onto the electrode body 3 can be reliably prevented. The material forming the fuse portion insulating member 80 may include, for example, polyimide resin, PFA, and PPS whose melting points are 200° C. or higher.

In the present embodiment, the base portion 80a of the fuse portion insulating member 80 covers not only the fuse portions 6h but also portions of the second connection portion 6f adjacent to the fuse portions 6h. Thus, the internal short-circuit can be more reliably prevented. Note that it may only be required that the fuse portion insulating member 80 covers at least the entirety of the fuse portions 6h, considering prevention of the internal short-circuit.

In the present embodiment, the fuse portion insulating member 80 has, as shown in FIG. 9, such a structure that the raised portion 80b enters the through-hole 6i sandwiched by the fuse portions 6h and the base portion 80a contacts and supports the fuse portions 6h. With this structure, the fuse portions 6h with small sectional areas are physically supported so that damage of the fuse portions 6h due to vibration etc. can be prevented and re-connection due to movement of the fused fuse portions 6h can be reliably prevented.

[External Terminal Protective Insulating Member]

As shown in FIG. 9, the external terminal protective insulating member 81 is placed between the electrode body 3 and each of the positive electrode terminal 7 and the positive electrode terminal conductive member 6a to cover the positive electrode terminal 7 and the positive electrode terminal conductive member 6a. As in the fuse portion insulating member 80, the external terminal protective insulating member 81 is fitted in and fixed to other through-holes 11f provided at the walls 11c of the internal insulating member 11. In the present embodiment, the external terminal protective insulating member 81 and the fuse portion insulating member 80 are adjacent to each other in the longitudinal direction of the positive electrode current collector 6b, and both members are arranged substantially flush with each other. These members may contact each other, or may be apart from each other.

The external terminal protective insulating member 81 prevents short-circuit due to contact between the positive electrode terminal 7 and the electrode body 3. Since the external terminal protective insulating member 81 is arranged apart from the fuse portions 6h, an insulating material having a lower thermal resistance than that of the fuse portion insulating member 80 can be used, and inexpensive insulating resin such as PP can be used.

[Production of Electrode Body]

The surfaces of the first electrode body element 3a and the second electrode body element 3b in a layer stacking direction thereof face each other directly or via other members, and accordingly, the first and second positive electrode tab groups 40a, 40b and the first and second negative electrode tab groups 50a, 50b are curved. In this manner, the first electrode body element 3a and the second electrode body element 3b are assembled into the single electrode body 3. For example, an adhesive tape is wound around the outer peripheral surfaces of the first electrode body element 3a and the second electrode body element 3b assembled with each other, and accordingly, the first and second electrode body elements 3a, 3b can be fixed. Alternatively, the first electrode body element 3a and the second electrode body element 3b can be assembled into the single member with these elements being arranged in the box-shaped or bag-shaped electrode body holder 14.

In the present embodiment, the electrode body 3 surrounded by the electrode body holder 14 formed in the box shape or the bag shape from the resin sheet is inserted into the rectangular exterior body 1. Then, the sealing plate 2 is fitted in the opening of the rectangular exterior body 1, and such a fitted portion is welded. In this manner, the opening of the rectangular exterior body 1 is sealed by the sealing plate 2. Then, the electrolyte is injected into the rectangular exterior body 1 through the electrolyte injection hole 15 provided at the sealing plate 2. Thereafter, the electrolyte injection hole 15 is sealed by the sealing member 16 such as a blind rivet.

In the rectangular secondary battery 20 according to the above-described embodiment, the first and second positive electrode tab groups 40a, 40b and the first and second negative electrode tab groups 50a, 50b are arranged at the sealing-plate-2-side end portion of the electrode body 3. In a state in which the positive electrode tab groups are curved, the positive electrode tab groups are connected to the electrode-body-3-side surface of the positive electrode current collector 6b arranged along the sealing plate 2. Moreover, in a state in which the negative electrode tab groups are curved, the negative electrode tab groups are connected to the electrode-body-3-side surface of the negative electrode current collector 8b arranged along the sealing plate 2. With this configuration, the secondary battery is formed with a higher volumetric energy density.

Second Embodiment

A second embodiment is different from the first embodiment in a portion from a second connection portion of a positive electrode current collector to a positive electrode terminal in a current path from an electrode body to the positive electrode terminal. Thus, differences from the first embodiment will be mainly described below.

Figure 10:
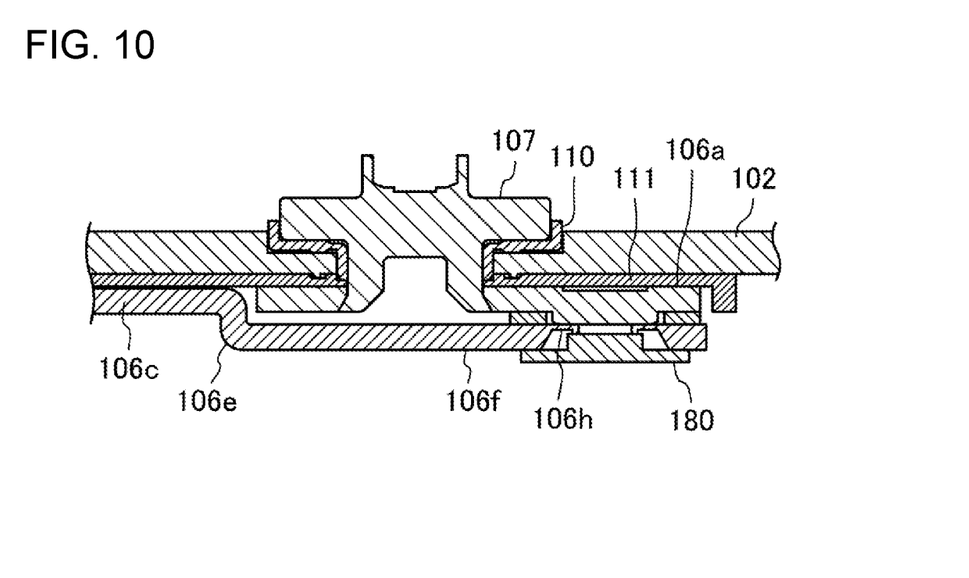
FIG. 10 is a schematic sectional view of a positive electrode terminal portion of a sealing plate according to another embodiment from an electrode body side.

In the present embodiment, as shown in FIG. 10, an annular fuse portion 106h having a thin portion is formed at a second connection portion 106f of the positive electrode current collector. The fuse portion 106h includes the thin portion having a smaller thickness than those of other portions of the positive electrode current collector. A cylindrical protrusion is formed at a positive electrode terminal conductive member 106a electrically connected to a positive electrode terminal 107, and the fuse portion 106h is welded to such a protrusion. With this configuration, the fuse portion 106h also serves as a terminal-side connection portion.

A fuse portion insulating member 180 is arranged on an electrode body (not shown) side (the lower side as viewed in the figure) of the fuse portion 106h. As in the first embodiment, the fuse portion insulating member 180 is made of a material whose melting point is 200° C. or higher, and is fitted in or fixed to through-holes (not shown) provided at walls (not shown) of an internal insulating member 111. A protrusion is provided at a center portion of the fuse portion insulating member 180, and contacts part of the fuse portion 106h to support the fuse portion 106h. Thus, as in the first embodiment, since the melting point of the fuse portion insulating member 180 is high, dropping of spark or a fuse piece onto the electrode body can be reliably prevented even when a fuse function works. Moreover, since the fuse portion insulating member 180 physically supports the fuse portion 106h, damage of the fuse portion 106h due to vibration etc. can be prevented and re-connection due to movement of the fused fuse portion 106h can be reliably prevented.

In the present embodiment, a first connection portion 106c of the positive electrode current collector is, as in the first embodiment, positioned inside the positive electrode terminal 107 in a longitudinal direction of a sealing plate 102, and is connected to the second connection portion 106f via a coupling portion 106e. Unlike the first embodiment, the fuse portion 106h is positioned outside the positive electrode terminal 107 in the longitudinal direction of the sealing plate 102. Note that as in the first embodiment, an external insulating member 110 is arranged between the positive electrode terminal 107 and the sealing plate 102, and electrically insulates these portions from each other.

With this configuration, an end portion of the first connection portion 106c of the positive electrode current collector can extend to the vicinity of the positive electrode terminal 107 in the present embodiment. Accordingly, the width of a positive electrode tab group connected to the first connection portion 106c can be expanded. As a result, a high-power secondary battery can be achieved.

Other Embodiments

The above-described embodiments are examples of the present disclosure. The present disclosure is not limited to these examples. The present disclosure may include a combination of these examples with a well-known technique, a traditional technique, and a publicly-known technique, or may be partially replaced. Moreover, the present disclosure also includes modifications at which those skilled in the art easily arrive.

The above-described embodiments have described the example where the electrode body 3 includes two electrode body elements, but the present disclosure is not limited to such an example. The electrode body 3 may include three or more electrode body elements. Each electrode body element is not limited to the multilayer electrode body, and may be of such a winding type that a band-shaped positive electrode plate and a band-shaped negative electrode plate are wound with a band-shaped separator being interposed therebetween. Alternatively, only an electrode body including a single electrode body element may be employed. The electrode body including the single electrode body element may be a winding electrode body configured such that a band-shaped positive electrode plate and a band-shaped negative electrode plate are wound with a band-shaped separator being interposed therebetween.

Insulating materials may be used for the positive-electrode-side and negative-electrode-side external insulating members, the positive-electrode-side and negative-electrode-side internal insulating members, and the external terminal protective insulating member, and are preferably resin. For example, polypropylene (PP), polyethylene (PE), or polyphenylene sulfide (PPS) may be used.

As the energy line used for welding (joint), a laser, an electron beam, etc. may be used.

Publicly-known materials may be used for the positive electrode plate, the negative electrode plate, the separator, the electrolyte, etc. A battery system of the secondary battery of the present disclosure is not limited. For example, a nonaqueous electrolyte secondary battery such as a lithium-ion battery may be employed. Moreover, the shape of the secondary battery of the present disclosure is not limited to a particular shape.

A coupling member coupling the fuse portion insulating member and the sealing-plate-to-current-collector insulating member may be used. With this configuration, the fuse portion insulating member is indirectly supported by the sealing-plate-to-current-collector insulating member.

A tab conductive member may be arranged between the tab and the first connection portion.

The fuse portion is the portion having the minimum sectional area perpendicular to the current direction in the current path from the tab to the external terminal, and the method for minimizing the sectional area is not limited to formation of the through-hole or reduction in the thickness. Various methods such as use of a different material, reduction in a width, or a combination thereof may be employed.

DESCRIPTION OF REFERENCE CHARACTERS

1 Rectangular Exterior Body
2 Sealing Plate
3 Electrode Body
3a First Electrode Body Element
3b Second Electrode Body Element
4 Positive Electrode Plate
4a Positive Electrode Core
4b Positive Electrode Active Material Mixture Layer
4d Positive Electrode Protective Layer
40 Positive Electrode Tab
40a, 40b Positive Electrode Tab Group
5 Negative Electrode Plate
5a Negative Electrode Core
5b Negative Electrode Active Material Mixture Layer
50 Negative Electrode Tab
50a, 50b Negative Electrode Tab Group
6a Positive Electrode Terminal Conductive Member
6b Positive Electrode Current Collector
6c First Connection Portion
6d Opening
6e Coupling Portion
6f Second Connection Portion 6g Terminal-Side Connection Portion
6h Fuse Portion
6i Through-Hole
7 Positive Electrode Terminal
8a Negative Electrode Terminal Conductive Member
8b Negative Electrode Current Collector
8c First Connection Portion
8d Through-Hole
8f Second Connection Portion
9 Negative Electrode Terminal
10 External Insulating Member
11 Internal Insulating Member
11a Base
11b Rib
11c Wall
11d Opening
11e Through-Hole
11f Through-Hole
12 External Insulating Member
13 Internal Insulating Member
13a Base
13b Rib
14 Electrode Body Holder
15 Electrolyte Injection Hole
16 Sealing Member
17 Gas Discharge Valve
20 Rectangular Secondary Battery
60, 61 Welded Portion
80 Fuse Portion Insulating Member
81 External Terminal Protective Insulating Member
100 Battery Case
102 Sealing Plate
106a Positive Electrode Terminal Conductive Member
106c First Connection Portion
106e Coupling Portion
106f Second Connection Portion
106h Fuse Portion
107 Positive Electrode Terminal
110 External Insulating Member
111 Internal Insulating Member
180 Fuse Portion Insulating Member

The invention claimed is:

1. A secondary battery comprising:
an electrode body configured such that a positive electrode plate and a negative electrode plate are stacked on each other with a separator being interposed therebetween; an exterior body having an opening and housing the electrode body;
a sealing plate sealing the opening; and
an external terminal attached to the sealing plate, wherein:
a tab provided at least at one of the positive electrode plate or the negative electrode plate is electrically connected to the external terminal via a current collector arranged between the electrode body and the sealing plate,
the current collector has a first connection portion connected to the tab or a tab conductive member connected to the tab and a second connection portion with a fuse portion having a slit,
the fuse portion is a portion formed with a minimum sectional area perpendicular to a current direction in a current path from the tab to the external terminal such that the fuse portion is fused when overcurrent flows in the current path,
a portion of the fuse portion facing the electrode body is covered with a fuse portion insulating member,
the fuse portion insulating member includes a plate portion and a raised portion protruding from the plate portion,
the raised portion is inserted into the slit of the fuse portion, and
the fuse portion insulating member is a member made of a material whose melting point is 200° C. or higher.

2. The secondary battery of claim 1, wherein the fuse portion insulating member contacts the fuse portion to support the fuse portion.

3. The secondary battery of claim 1, wherein the fuse portion insulating member also covers a portion of the second connection portion adjacent to the fuse portion.

4. The secondary battery of claim 1, wherein a sealing-plate-to-current-collector insulating member is arranged between the sealing plate and the current collector, and the fuse portion insulating member is supported by the sealing-plate-to-current-collector insulating member.

5. The secondary battery of claim 1, wherein
on a side of the external terminal facing the electrode body, an external terminal protective insulating member is arranged between the external terminal and the electrode body,
a sealing-plate-to-current-collector insulating member is arranged between the sealing plate and the current collector, and
the external terminal protective insulating member is supported by the sealing-plate-to-current-collector insulating member.

6. The secondary battery of claim 5, wherein
the exterior body is in a rectangular shape,
the first connection portion is positioned inside the second connection portion in a longitudinal direction of the sealing plate,
the second connection portion has a terminal-side connection portion to be connected to the external terminal or an external terminal conductive member connected to the external terminal, and
the fuse portion is positioned outside the terminal-side connection portion in the longitudinal direction of the sealing plate.

* * * * *